US012550943B2

(12) United States Patent
Jung et al.

(10) Patent No.: US 12,550,943 B2
(45) Date of Patent: Feb. 17, 2026

(54) AEROSOL GENERATING DEVICE INCLUDING REAL-TIME CLOCK AND OPERATING METHOD OF THE SAME

(71) Applicant: KT&G CORPORATION, Daejeon (KR)

(72) Inventors: Hyung Jin Jung, Seoul (KR); Jaemin Lee, Siheung-si (KR)

(73) Assignee: KT&G Corporation, Daejeon (KR)

( * ) Notice: Subject to any disclaimer, the term of this patent is extended or adjusted under 35 U.S.C. 154(b) by 359 days.

(21) Appl. No.: 18/025,089

(22) PCT Filed: Oct. 21, 2021

(86) PCT No.: PCT/KR2021/014781
§ 371 (c)(1),
(2) Date: Mar. 7, 2023

(87) PCT Pub. No.: WO2022/086201
PCT Pub. Date: Apr. 28, 2022

(65) Prior Publication Data

US 2023/0329351 A1 Oct. 19, 2023

(30) Foreign Application Priority Data

Oct. 22, 2020 (KR) ........................ 10-2020-0137443

(51) Int. Cl.
*A24F 40/53* (2020.01)
*A24F 40/465* (2020.01)
(Continued)

(52) U.S. Cl.
CPC ............ *A24F 40/53* (2020.01); *A24F 40/465* (2020.01); *A24F 40/60* (2020.01); *G04F 1/005* (2013.01); *G04G 5/00* (2013.01)

(58) Field of Classification Search
CPC ........................................................ A24F 40/53
See application file for complete search history.

(56) References Cited

U.S. PATENT DOCUMENTS 10,512,285 B2 12/2019 Kuczaj
11,978,540 B2 * 5/2024 Alarcon ................ G16H 40/67
(Continued)

FOREIGN PATENT DOCUMENTS

EP 574 920 A1 9/2005
GB 2527403 A * 12/2015 ........ A61M 15/0083
(Continued)

OTHER PUBLICATIONS

Extended European Search Report issued Jan. 8, 2024 in Application No. 21883269.9.
(Continued)

*Primary Examiner* — Russell E Sparks
(74) *Attorney, Agent, or Firm* — Foley & Lardner LLP

(57) ABSTRACT

Disclosed is an aerosol generating device including a real-time clock (RTC) configured to output time information measured from a reference time; a non-volatile memory; and a processor configured to: store the time information in the non-volatile memory when a preset operation is performed, when the RTC is initialized, restore the time information by correcting the reference time based on an initial reference time and an accumulated elapsed time from the initial reference time, and when the preset operation is performed again, store updated time information reflecting an elapsed time from the corrected reference time in the non-volatile memory.

11 Claims, 8 Drawing Sheets

(51) Int. Cl.

| | |
|---|---|
| ***A24F 40/60*** | (2020.01) |
| ***G04F 1/00*** | (2006.01) |
| ***G04G 5/00*** | (2013.01) |

(56) References Cited

U.S. PATENT DOCUMENTS

| | | | | |
|---|---|---|---|---|
| 2013/0319439 | A1 | 12/2013 | Gorelick et al. | |
| 2015/0143156 | A1 | 5/2015 | Chance et al. | |
| 2015/0173124 | A1 | 6/2015 | Qiu | |
| 2017/0215480 | A1 | 8/2017 | Qiu | |
| 2017/0224024 | A1 | 8/2017 | Jochnowitz et al. | |
| 2018/0279689 | A1 | 10/2018 | Qiu | |
| 2018/0325179 | A1 | 11/2018 | Li et al. | |
| 2020/0221782 | A1 | 7/2020 | Lim | |
| 2020/0383377 | A1 | 12/2020 | Chong et al. | |
| 2021/0154420 | A1* | 5/2021 | Jorgensen | A61M 15/06 |
| 2022/0142249 | A1 | 5/2022 | Lim et al. | |
| 2022/0183385 | A1* | 6/2022 | Yilmaz | A24F 40/53 |

FOREIGN PATENT DOCUMENTS

| | | | |
|---|---|---|---|
| JP | 2008-104251 | A | 5/2008 |
| JP | 2008-136664 | A | 6/2008 |
| JP | 5656523 | B2 | 3/2015 |
| JP | 2016-214648 | A | 12/2016 |
| JP | 3215509 | U | 3/2018 |
| JP | 2019-152740 | A | 9/2019 |
| KR | 10-2016-0009678 | A | 1/2016 |
| KR | 20-2016-0001476 | U | 5/2016 |
| KR | 10-214168 | B1 | 8/2020 |
| KR | 10-2020-0105692 | A | 9/2020 |
| WO | 2018/087719 | A1 | 5/2018 |
| WO | 2018/202651 | A1 | 11/2018 |
| WO | 2019/220348 | A1 | 11/2019 |
| WO | 2020/026319 | A1 | 2/2020 |

OTHER PUBLICATIONS

Japanese Office Action dated May 7, 2024 in Application No. 2023-521663.

Notice of Allowance for Korean Application 10-2020-0137443 dated Feb. 15, 2023.

Office Action for Korean Application 10-2020-0137443 dated Aug. 2, 2022.

Written Opinion for PCT/KR2021/014781 dated Jan. 25, 2022.

International Search Report for PCT/KR2021/014781 dated Jan. 25, 2022.

Chinese Office Action on CN Patent Application No. 202180061703.3 dated Dec. 19, 2025.

* cited by examiner

AEROSOL GENERATING DEVICE INCLUDING REAL-TIME CLOCK AND OPERATING METHOD OF THE SAME

This application is a National Stage of International Application No. PCT/KR2021/014781 filed Oct. 21, 2021, claiming priority based on Korean Patent Application No. 10-2020-0137443 filed Oct. 22, 2020.

TECHNICAL FIELD

One or more embodiments of the present disclosure relate to an aerosol generating device including a real-time clock (RTC), and an operating method of the same.

BACKGROUND ART

Recently, the demand for alternative methods to overcome the disadvantages of traditional cigarettes has increased. For example, there is growing demand for an aerosol generating system which generates an aerosol by heating an aerosol generating material or a cigarette without combustion.

In general, an aerosol generating device has a warranty period of about one year from the date of sale or the date of manufacture. Since a customer has to pay for replacement or repair of the product after the warranty period expires, management of the warranty period is important in terms of after-sales service (A/S).

DISCLOSURE

Technical Problem

In the process of exporting an aerosol generating device to various countries, the period between the manufacturing date and the date of sale of the aerosol generating device may be prolonged, which may raise an issue with respect to the warranty period especially when the warranty period runs from the date of sale. Also, warranty period records may be difficult to manage centrally because of diverse sales channels such as proxy sales. In this respect, there is a need for techniques for managing the warranty period of an aerosol generating device.

Technical problems to be solved by the present disclosure are not limited to the above-described problems, and other technical problems may be solved by the following embodiments.

Technical Solution

One or more embodiments of the present disclosure provide an aerosol generating device including a real-time clock (RTC) configured to output time information measured from a reference time; a non-volatile memory; and a processor configured to: store the time information in the non-volatile memory when a preset operation is performed, when the RTC is initialized, restore the time information by correcting the reference time based on an initial reference time and an accumulated elapsed time from the initial reference time, and when the preset operation is performed again, store updated time information reflecting an elapsed time from the corrected reference time.

Advantageous Effects

The present disclosure may provide an aerosol generating device including a real-time clock (RTC) and an operating method of the same. In detail, the aerosol generating device according to the present disclosure may obtain information on the number of days of use of the aerosol generating device by using an RTC that outputs time information measured from a reference time. The RTC may be embedded in a processor (e.g., a micro controller unit (MCU)) of the aerosol generating device, and may receive power from a battery indirectly through the processor.

However, the RTC may be reset to the default reference time when power supply is stopped by resetting or booting the processor, and information on the number of days of use may be lost. The aerosol generating device may include a separate auxiliary power source (e.g., a coin battery) that continuously supplies power to the RTC so as to prevent resetting of the RTC. However, in this case, the manufacturing cost of the aerosol generating device may increase. Also, since the battery included in the aerosol generating device has a higher voltage than a voltage supported by a power source input pin of the RTC due to a heating performance, a separate circuit (e.g., a regulator) for step-down is required to connect the battery directly to the RTC. As a result, the manufacturing cost of the aerosol generating device may increase.

The aerosol generating device according to the present disclosure may store time information in a non-volatile memory, and when the RTC is initialized, the time information may be restored by correcting reference time based on the initial synchronization time and the accumulated elapsed time. In other words, the aerosol generating device according to the present disclosure may restore existing time information by using information stored in the non-volatile memory even when the RTC is initialized. Thus, information on the number of days of use of the aerosol generating device may be correctly maintained without an increase in manufacturing cost due to the inclusion of a separate auxiliary power source or step-down circuit.

BEST MODE

Figure 1:
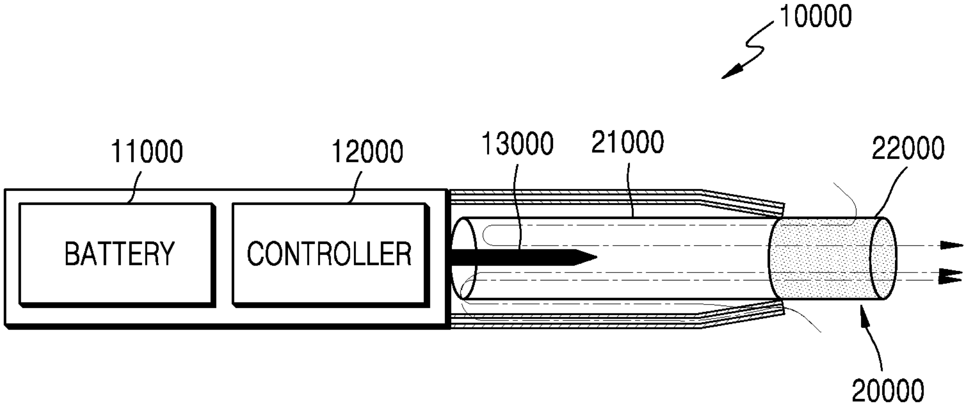
FIGS. 1 through 4 are views illustrating examples in which an aerosol generating article is inserted into an aerosol generating device.

An aerosol generating device according to one or more embodiments includes a real-time clock (RTC) configured to output time information measured from a reference time; a non-volatile memory; and a processor configured to: store the time information in the non-volatile memory when a preset operation is performed, when the RTC is initialized, restore the time information by correcting the reference time based on an initial reference time and an accumulated elapsed time from the initial reference time, and when the preset operation is performed again, store updated time information reflecting an elapsed time from the corrected reference time in the non-volatile memory.

The processor may calculate the accumulated elapsed time based on the initial reference time and the time information previously stored in the non-volatile memory and may obtain information on the number of days of use of the aerosol generating device based on the accumulated elapsed time.

The initial reference time may be set by a supplier in a manufacturing process of the aerosol generating device and may be stored in the processor.

The RTC may be initialized when the processor is reset or booted, when an abnormal operation of the aerosol generating device is detected, or when power supply to the RTC is stopped.

The processor may correct the reference time by adding the accumulated elapsed time to the initial reference time.

The preset operation may include at least one of resetting or booting of the processor, termination of a shipping mode, termination of a smoking operation, starting of a charging operation, and receiving of a user input.

The processor may overwrite the updated time information in the non-volatile memory.

The RTC may start measurement of the time information when the aerosol generating device is released from a shipping mode.

The aerosol generating device may further include a user interface that outputs the time information output by the RTC to the outside as the user input is received.

The processor may correspond to a micro controller unit (MCU), and the RTC may be embedded in the MCU.

An operating method of an aerosol generating device according to one or more embodiments includes obtaining time information measured from a reference time by using a real-time clock (RTC), storing the time information in a non-volatile memory when a preset operation is performed, when the RTC is initialized, restoring the time information by correcting the reference time based on the initial reference time and an accumulated elapsed time from the initial reference time, and when the present operation is performed again, storing updated time information reflecting an elapsed time from the corrected reference time to time when the preset operation is performed, in the non-volatile memory.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIGS. 1 through 4 are diagrams showing examples in which an aerosol-generating article is inserted into an aerosol generating device.

Figure 2:
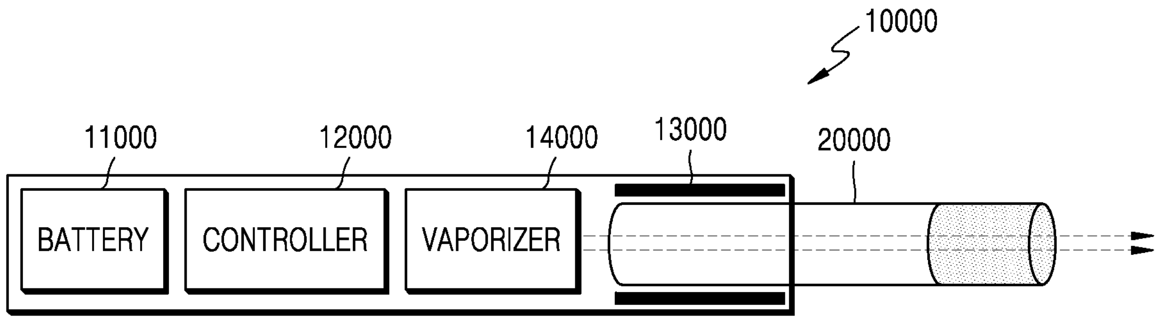
Figure 3:
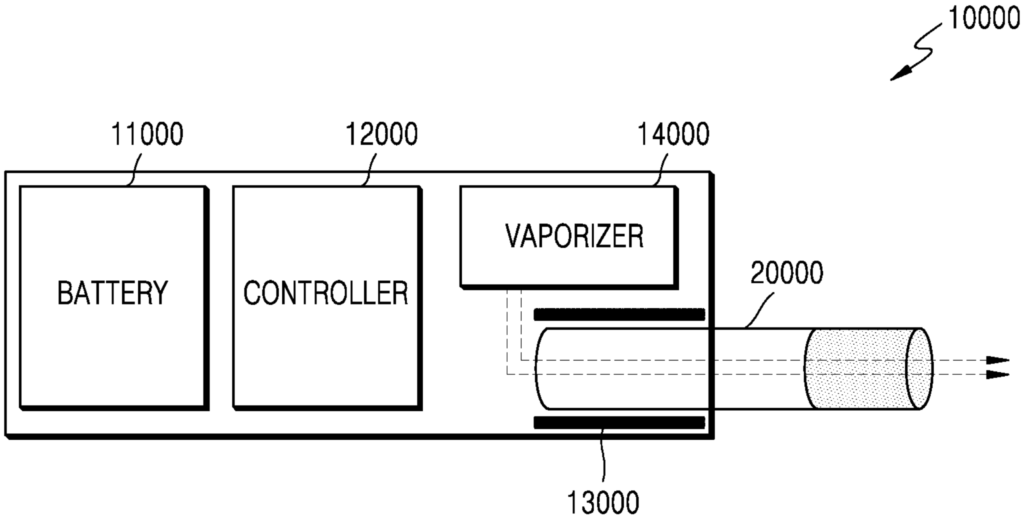
Figure 4:
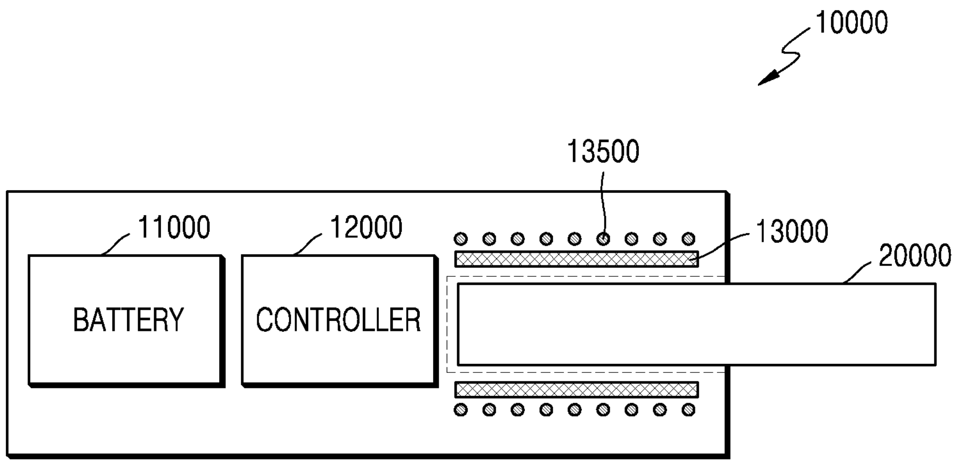

Referring to FIG. 1, the aerosol generating device 10000 may include a battery 11000, a controller 12000, and a heater 13000. Referring to FIGS. 2 and 3, the aerosol generating device 10000 may further include a vaporizer 14000. Referring to FIG. 4, the aerosol generating device 1000 may further include an induction coil 13500. Also, the aerosol-generating article 20000 may be inserted into an inner space of the aerosol generating device 10000. The aerosol generating device 10000 and the aerosol generating article 20000 may constitute an aerosol generating system.

FIGS. 1 through 4 illustrate components of the aerosol generating device 10000, which are related to the present embodiment. Therefore, it will be understood by one of ordinary skill in the art related to the present embodiment that other components may be further included in the aerosol generating device 10000, in addition to the components illustrated in FIGS. 1 through 4.

Also, FIGS. 2 and 3 illustrate that the aerosol generating device 10000 includes the heater 13000. However, as necessary, the heater 13000 may be omitted. Also, in FIGS. 2 and 3, the aerosol generating device 10000 is used together with the aerosol generating article 20000. However, if necessary, the aerosol generating article 20000 may be omitted. In this case, the aerosol generating device 10000 may include only a vaporizer 14000.

FIG. 1 illustrates that the battery 11000, the controller 12000, and the heater 13000 are arranged in series. FIG. 2 illustrates that the battery 11000, the controller 12000, the vaporizer 14000, and the heater 13000 are arranged in series. Also, FIG. 3 illustrates that the vaporizer 14000 and the heater 13000 are arranged in parallel. Also, in FIG. 4, the induction coil 13500 may be arranged to surround the heater 13000. However, the internal structure of the aerosol generating device 10000 is not limited to the structures illustrated in FIGS. 1 through 4. In other words, according to the design of the aerosol generating device 10000, the battery 11000, the controller 12000, the heater 13000, the induction coil 13500, and the vaporizer 14000 may be differently arranged.

When the aerosol-generating article 20000 is inserted into the aerosol generating device 10000, the aerosol generating device 10000 may operate the heater 13000 and/or the vaporizer 14000 to generate aerosol from the aerosol-generating article 20000 and/or the vaporizer 14000. The aerosol generated by the heater 13000 and/or the vaporizer 14000 is delivered to a user by passing through the aerosol-generating article 20000.

As necessary, even when the aerosol-generating article 20000 is not inserted into the aerosol generating device 10000, the aerosol generating device 10000 may heat the heater 13000.

The battery 11000 supplies electric power to be used for the aerosol generating device 10000 to operate. For example, the battery 11000 may supply power to heat the heater 13000 or the vaporizer 14000, and may supply power for operating the controller 12000. Also, the battery 11000 may supply power for operations of a display, a sensor, a motor, etc. mounted in the aerosol generating device 10000.

The controller 12000 may generally control operations of the aerosol generating device 10000. In detail, the controller 12000 may control not only operations of the battery 11000, the heater 13000, the induction coil 13500 and the vaporizer 14000, but also operations of other components included in the aerosol generating device 10000. Also, the controller 12000 may check a state of each of the components of the aerosol generating device 10000 to determine whether or not the aerosol generating device 10000 is able to operate.

The controller 12000 may include at least one processor. A processor can be implemented as an array of a plurality of logic gates or can be implemented as a combination of a microprocessor and a memory in which a program executable in the microprocessor is stored. It will be understood by one of ordinary skill in the art that the controller 12000 can be implemented in other forms of hardware.

The heater 13000 may be heated by the power supplied from the battery 11000. However, embodiments are not necessarily limited thereto. The heater 13000 may be heated by a variable magnetic field generated from the induction coil 13500. In this case, the induction coil 13500 may generate a variable magnetic field by power supplied from the battery 11000.

In one example, as shown in FIG. 1, when the aerosol-generating article 20000 is inserted into the aerosol generating device 10000, the heater 13000 may be located inside the aerosol-generating article 20000. Thus, the heated heater 13000 may be in direct contact with an aerosol generating material in the aerosol-generating article 20000 and increase a temperature of the aerosol generating material.

In another example, as shown in FIGS. 2 to 4, when the aerosol-generating article 20000 is inserted into the aerosol generating device 10000, the heater 13000 may be located outside the aerosol-generating article 20000. Thus, heat generated from the heater 13000 may be transferred from the outside of the aerosol-generating article 20000 to the aerosol generating material therein In one example, as shown in FIGS. 1 to 3, the heater 13000 may include an electro-resistive heater. For example, the heater 13000 may include an electrically conductive track, and the heater 13000 may be heated when currents flow through the electrically conductive track. However, the heater 13000 is not limited to the example described above and may include all heaters which may be heated to a desired temperature. Here, the desired temperature may be preset in the aerosol generating device 10000 or may be set by a user.

In another example, as shown in FIG. 4, the heater 13000 may generate heat by induction heating. In this case, the aerosol generating device 13000 may further include an induction coil 13500 for generating an alternating magnetic field. The induction coil 13500 may generate a variable magnetic field as power is supplied from the battery 11000, and the heater 13000 may include a susceptor that is heated in response to the variable magnetic. The susceptor may include metal or carbon. For example, the susceptor may include at least one of ferrite, ferromagnetic alloy, stainless steel, and aluminum.

Also, the susceptor may include at least one of a ceramic, such as graphite, molybdenum, silicon carbide, niobium, nickel alloy, a metal film, zirconia, or the like, a transition metal, such as nickel (Ni) or cobalt (Co), and metalloid, such as boron (B) or phosphorus (P). However, the susceptor included in the heater 13000 is not limited to the above-described example, as long as the susceptor may be heated to a desired temperature as a variable magnetic field is applied.

The heater 13000 may include a tube-type heating element, a plate-type heating element, a needle-type heating element, or a rod-type heating element, and may heat the inside or the outside of the aerosol-generating article 20000, according to the shape of the heating element.

Also, the aerosol generating device 10000 may include a plurality of heaters 13000. Here, the plurality of heaters 13000 may be inserted into the aerosol-generating article 20000 or may be arranged outside the aerosol-generating article 20000. Also, some of the plurality of heaters 13000 may be inserted into the aerosol-generating article 20000 and the others may be arranged outside the aerosol-generating article 20000. In addition, the shape of the heater 13000 is not limited to the shapes illustrated in FIGS. 1 through 4 and may include various shapes.

The vaporizer 14000 may generate aerosol by heating a liquid composition and the generated aerosol may pass through the aerosol-generating article 20000 to be delivered to a user. In other words, the aerosol generated via the vaporizer 14000 may move along an air flow passage of the aerosol generating device 10000 and the air flow passage may be configured such that the aerosol generated via the vaporizer 14000 passes through the aerosol-generating article 20000 to be delivered to the user.

For example, the vaporizer 14000 may include a liquid storage, a liquid delivery element, and a heating element, but it is not limited thereto. For example, the liquid storage, the liquid delivery element, and the heating element may be included in the aerosol generating device 10000 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 14000 or may be formed integrally with the vaporizer 14000.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14000 may be referred to as a cartridge, a cartomizer, or an atomizer, but it is not limited thereto.

The aerosol generating device 10000 may further include other components in addition to the battery 11000, the controller 12000, the heater 13000, the induction coil 13500, and the vaporizer 14000. For example, the aerosol generating device 10000 may include a display capable of outputting visual information and/or a motor for outputting haptic information. Also, the aerosol generating device 10000 may include at least one sensor (e.g., a puff sensor, a temperature sensor, an aerosol-generating article insertion detecting sensor, etc.). Also, the aerosol generating device 10000 may be formed as a structure that, even when the aerosol-generating article 20000 is inserted into the aerosol generating device 10000, may introduce external air or discharge internal air.

Although not illustrated in FIGS. 1 through 4, the aerosol generating device 10000 and an additional cradle may form together a system. For example, the cradle may be used to charge the battery 11000 of the aerosol generating device 10000. Alternatively, the heater 13000 may be heated when the cradle and the aerosol generating device 10000 are coupled to each other.

The aerosol-generating article 20000 may be similar to a general combustive cigarette. For example, the aerosol-generating article 20000 may be divided into a first portion including an aerosol generating material and a second portion including a filter, etc. Alternatively, the second portion of the aerosol generating article 20000 may also include an aerosol generating material. For example, an aerosol generating material made in the form of granules or capsules may be inserted into the second portion.

The entire first portion may be inserted into the aerosol generating device 10000, and the second portion may be exposed to the outside. Alternatively, only a portion of the first portion may be inserted into the aerosol generating device 10000, or the entire first portion and a portion of the second portion may be inserted into the aerosol generating device 10000. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 10000. For example, opening and closing of the air passage and/or a size of the air passage formed in the aerosol generating device 10000 may be adjusted by the user. Accordingly, the amount of smoke and a smoking impression may be adjusted by the user. As another example, the external air may flow into the aerosol-generating article 20000 through at least one hole formed in a surface of the aerosol-generating article 20000.

Figure 5:
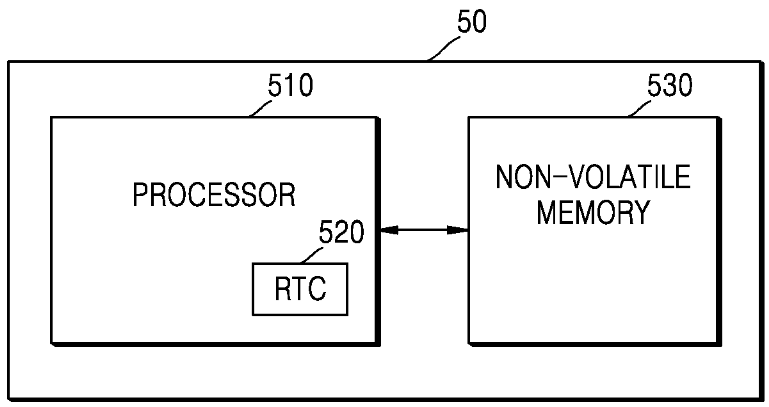
FIG. 5 is a block diagram illustrating the configuration of an aerosol generating device according to an embodiment.

FIG. 5 is a block diagram illustrating the configuration of an aerosol generating device according to an embodiment.

Referring to FIG. 5, an aerosol generating device 50 may include a processor 510, a real-time clock (RTC) 520, and a non-volatile memory 530. The aerosol generating device 50 and the processor 510 may respectively correspond to the aerosol generating device 10000 and the controller 12000 of FIGS. 1 through 4. Thus, a redundant description thereof will be omitted.

Components related to the present embodiment are shown in the aerosol generating device 50 shown in FIG. 5. Thus, it may be understood by those of ordinary skill in the art related to the present embodiment that other components not shown in FIG. 5 may be further included in the aerosol generating device 50. For example, the aerosol generating device 50 may further include the battery 11000, the heater 13000, the induction coil 13500, and the vaporizer 14000 described with reference to FIGS. 1 through 4.

The processor 510 may correspond to a micro controller unit (MCU), and the RTC 520 may be embedded in the processor 510. The processor 510 may be powered by a main battery (e.g., the battery 11000 of FIGS. 1 through 4) included in the aerosol generating device 50, and the RTC 520 may be indirectly be powered through the processor 510.

The RTC 520 may output time information measured from a reference time. For example, when the reference time is 0:00 on Jan. 1, 1970, the RTC 520 may measure the elapsed time from 0:00 on Jan. 1, 1970. In this case, when one year has passed since the RTC 520 started measuring the time information, the RTC 520 may output time information of 0:00 on Jan. 1, 1971.

The RTC 520 may output the time information measured from an initial reference time in real time while power supply is continued. However, when the power supply to the RTC 520 is stopped, as the reference time of the RTC 520 is initialized, existing time information may be lost. For example, the RTC 520 may be initialized when the processor 510 is reset or booted or when the power supply to the RTC 520 is stopped as an abnormal operation of the aerosol generating device 50 is detected. If the RTC 520 is initialized, the time information measured from the default reference time may be output by the RTC 520. The default reference time may a specific time (e.g., 12:00 a.m. on Jan. 1, 1970) which is preset in the RTC 520.

Since the default reference time of the RTC 520 is determined regardless of the time when the aerosol generating device 50 is manufactured, the reference time of the RTC 520 may be synchronized with a certain time (e.g., manufacturing time) (hereinafter "initial synchronization time" or "initial reference time") when the aerosol generating device 50 is manufactured. That is, the reference time of the RTC 520 may be updated from the default reference time (e.g., 12:00 a.m. on Jan. 1, 1970) to the initial synchronization time (i.e., initial reference time) (e.g., 12:00 a.m. on Jan. 1, 2020). In this case, the initial synchronization time may be determined by a supplier in the manufacturing process of the aerosol generating device 50, and the reference time of the RTC 520 may be synchronized with (i.e., updated to) the initial synchronization time.

As aforementioned, a time difference may exist between the time when the aerosol generating device 50 is manufactured, and the time when the aerosol generating device 50 is sold to an end user. Because the aerosol generating device 50 is not in use by a user in a state in which the aerosol generating device 50 is transported or stored, calculation of the number of days of use using the RTC 520 should not be performed. Thus, measurement of the time information by using the RTC 520 may be started only when the aerosol generating device 50 is released from a shipping mode (i.e., when the shipping mode is terminated). The shipping mode may be considered terminated when a user who purchased the aerosol generating device 50 use it for the first time. For example, the shipping mode may be terminated when charging of the aerosol generating device 50 starts (for example, when the charging port of the aerosol generating device 50 is connected to an external power source). Once the shipping mode is terminated, the RTC 520 may start measuring the time and add the measured time (e.g., two days) to the initial synchronization time (e.g., 12:00 a.m. on Jan. 1, 2020) such that the elapsed time from the initial synchronization time is output (e.g., the output time information is 12:00 a.m. on Jan. 3, 2020).

The non-volatile memory 530 may store the time information output from the RTC 520. The non-volatile memory 530 is initialized at the time of manufacture or shipment of the aerosol generating device 50. After the RTC 520 starts measuring the time information, the non-volatile memory 530 may receive and store the time information output from the RTC 520. Before measuring of the time information starts, the RTC 520 may output the current reference time.

The processor 510 may periodically store the time information output from the RTC 520 in the non-volatile memory 530. However, embodiments are not limited thereto. For example, processor 510 may store the time information in the non-volatile memory 530 when a preset operation is performed. The preset operation may include at least one of resetting or booting of the processor 510, release from the shipping mode, termination of a smoking operation (e.g., a heating operation of a heater), starting of a charging operation, receiving of a user input (e.g., touch or button input). However, embodiments are not limited thereto. The processor 510 may store the time information output from the RTC 520 in the non-volatile memory 530 when it is determined that the preset operation is performed.

When the RTC 520 is initialized, the processor 510 may restore the time information measured before the initialization occurred by correcting the reference time based on the initial synchronization time and the accumulated elapsed time. In other words, even if the RTC 520 is initialized, the processor 510 may restore existing (i.e., previously-measured) time information by using the information stored in the non-volatile memory 530. Thus, information on the number of days of use of the aerosol generating device 50 may be maintained without the increase of the manufacturing cost due to the inclusion of a separate auxiliary power source or step-down circuit. Because the non-volatile memory 530 maintains the previously-stored information even when power supply is stopped, the previously-stored information in the non-volatile memory 530 may be prevented from being lost even when the processor 510 is reset or booted.

On the other hand, after the time information is restored, when the preset operation is performed again, the processor 510 may store updated time information reflecting the elapsed time from the corrected reference time to a time when the preset operation is performed again in the non-volatile memory 530. The processor 510 may overwrite the updated time information in the non-volatile memory 530. In this way, the processor 510 may restore the time information by correcting the reference time whenever the RTC 520 is initialized. Accordingly, the processor 510 may update the number of days of use without additional calculation with respect to the information previously stored in the non-volatile memory 530. Hereinafter, a process in which the processor 510 manages the information on the number of days of use by using the RTC 520 and the non-volatile memory 530, will be described in more detail with reference to FIGS. 6 and 7.

Figure 6:
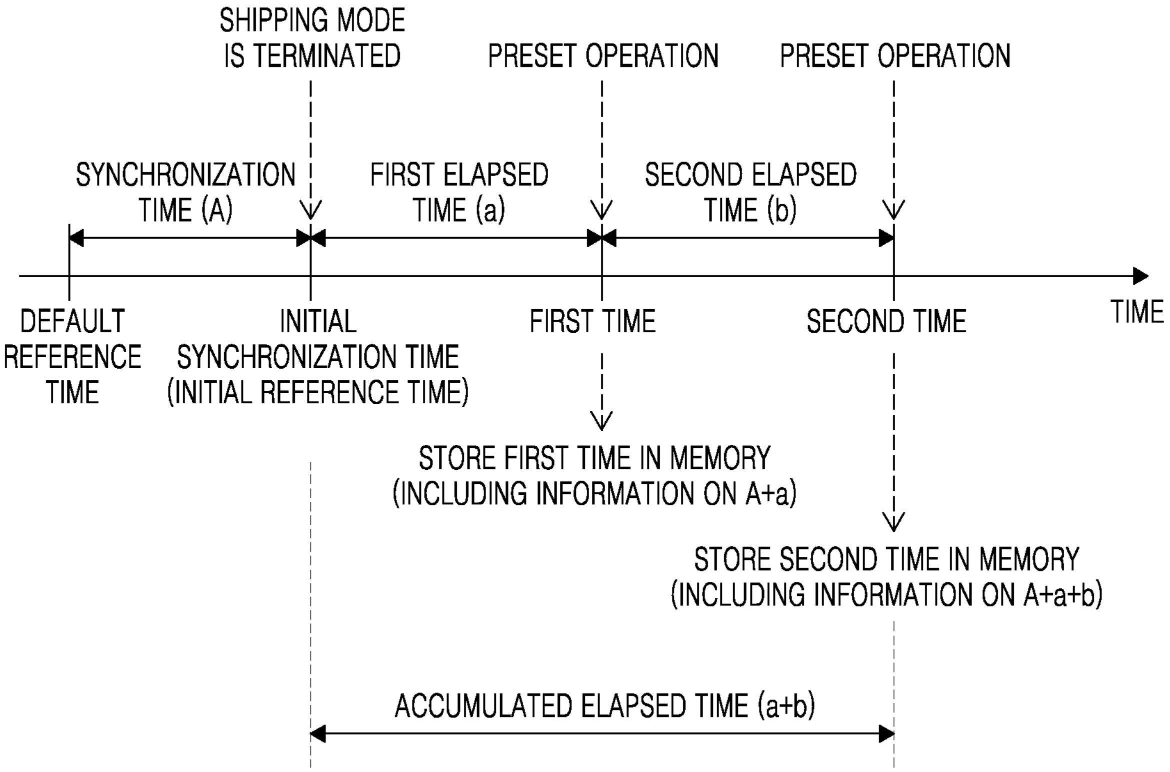
FIG. 6 is a view for describing a process of obtaining information on the number of days of use of an aerosol generating device by using a real-time clock (RTC), according to an embodiment.

FIG. 6 is a view for describing a process of obtaining information on the number of days of use of an aerosol generating device by using an RTC, according to an embodiment.

Referring to FIG. 6, an example of the time information output by the RTC (e.g., the RTC 20 of FIG. 5) included in the aerosol generating device (e.g., the aerosol generating device 50 of FIG. 5) according to passage of time is shown. As described above, a time output by the RTC in the manufacturing process of the aerosol generating device, may be updated from a default reference time to an initial synchronization time (i.e., an initial reference time). A period between the initial synchronization time and the default reference time may be referred to as a synchronization time A and may be stored in the aerosol generating device.

The RTC may start measuring of the time information as the shipment mode of the aerosol generating device is released. For example, when a first elapsed time "a" has elapsed after the shipping mode of the aerosol generating device is terminated, the RTC may output a first time. If a preset operation is performed at this point, information on the first time output from the RTC may be stored in a non-volatile memory (e.g., the non-volatile memory 530 of FIG. 5). Information on the synchronization time A and the first elapsed time "a" may be included in the information on the first time.

When a second elapsed time "b" has elapsed from the first time, the RTC may output a second time. If a preset operation is performed again at this point, information on the second time output from the RTC may be stored in the non-volatile memory. The information on the second time may include the synchronization time A, the first elapsed time "a," and the second elapsed time "b."

The initial synchronization time or the synchronization time A are previously known to the processor of the aerosol generating device. Therefore, the processor may calculate an accumulated elapsed time (a+b) based on the time information (e.g., information on the second time) previously-stored in the non-volatile memory and the initial synchronization time. For example, the processor may calculate the accumulated elapsed time (a+b) by subtracting the initial synchronization time from the second time stored in the non-volatile memory. Also, the processor may calculate the accumulated elapsed time (a+b) by subtracting the synchronization time A from the time (A+a+b) between the second time and the synchronization time.

The processor may obtain information on the number of days of use of the aerosol generating device based on the accumulated elapsed time (a+b). The accumulated elapsed time (a+b) may correspond to the number of days of use of the aerosol generating device.

Figure 7:
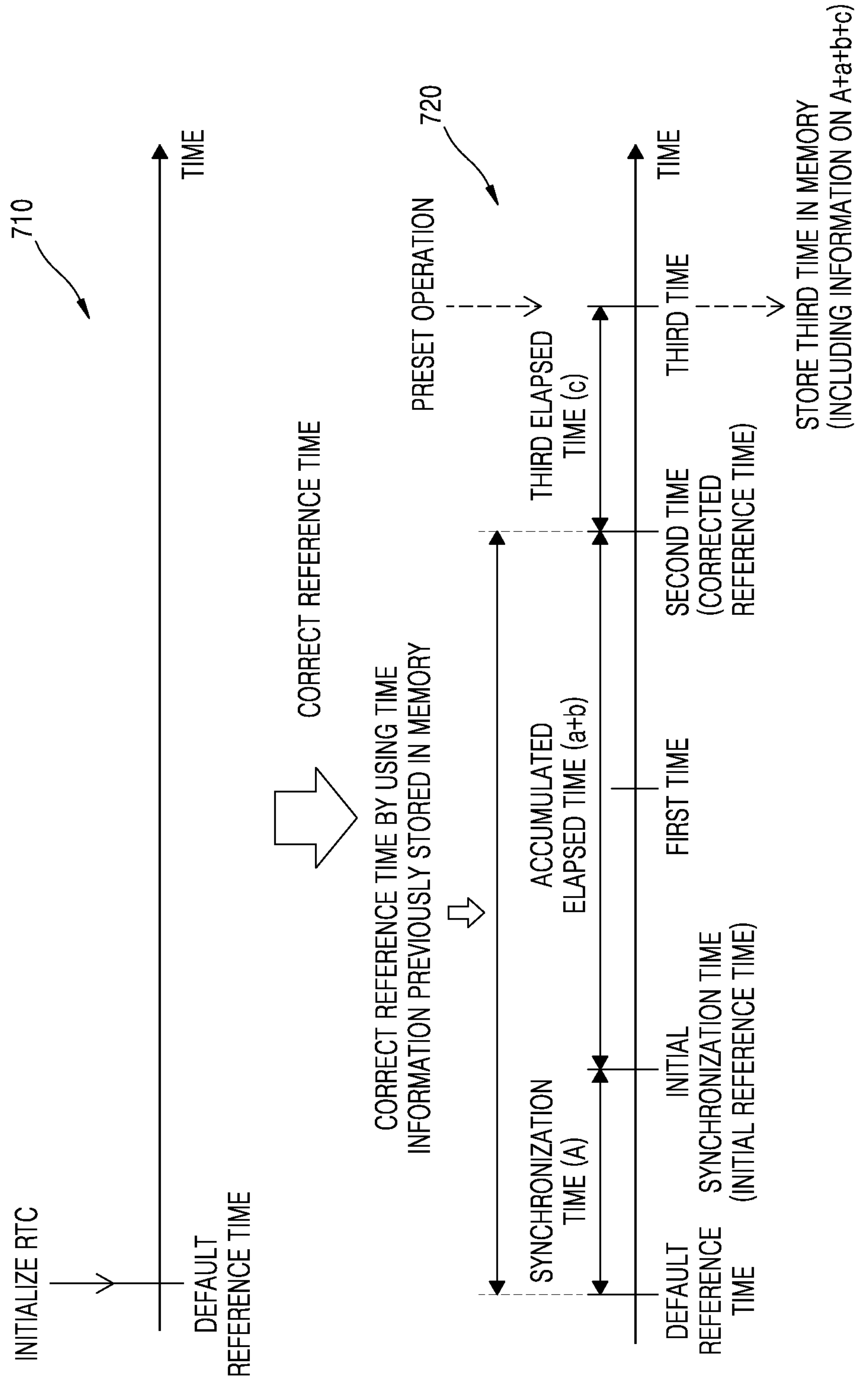
FIG. 7 is a view for describing a process of restoring time information of an RTC when the RTC is initialized, according to an embodiment.

FIG. 7 is a view for describing a process of restoring time information of an RTC when the RTC is initialized, according to an embodiment.

The RTC (e.g., the RTC 520 of FIG. 5) may be initialized when an initialization event occurs. Examples of the initialization event include, but are not limited to, when the processor (e.g., the processor 510 of FIG. 5) is reset or booted, when an abnormal operation of the aerosol generating device (e.g., the aerosol generating device 50 of FIG. 5) is detected, and when power supply to the RTC 520 is stopped (e.g., when the battery such as the battery 11000 of FIGS. 1 through 4 is exhausted). For example, when a user input through a button continues for more than a preset time, power supply to components included in the aerosol generating device may be temporarily stopped and then resumed as a hardware reset of the aerosol generating device occurs. In this process, power supply to the RTC is stopped, and the RTC may be initialized.

Referring to a timing diagram 710, an example of time information output by the RTC when the RTC is initialized in an aerosol generating device according to the related art. In the aerosol generating device according to the related art, when the RTC is initialized, the RTC outputs a default reference time. Thus, existing time information output by the RTC may be lost.

Referring to a timing diagram 720, a process of restoring existing time information by reference time correction in the aerosol generating device according to the present disclosure is shown. Because the non-volatile memory (e.g., the non-volatile memory 530 of FIG. 5) maintains existing information even when power supply is stopped, the processor may correct a reference time of the RTC by using time information stored in the non-volatile memory. For example, assuming that the RTC is initialized when the accumulated elapsed time (a+b) has passed from the initial synchronization time (i.e., when the time information output by the RTC indicates the second time), the processor may correct the reference time by adding the accumulated elapsed time (a+b) to the initial synchronization time.

The RTC may resume measurement of time information based on the corrected reference time (e.g., a second time). For example, when a third elapsed time "c" has elapsed after RTC initialization is performed (i.e., after the reference time is corrected to the second time), the RTC may output the third time. If a preset operation is performed at this point, information on the third time output from the RTC may be stored in the non-volatile memory. Information on the third time may include a synchronization time A, a first elapsed time "a," a second elapsed time "b," and a third elapsed time "c." In this way, even when the RTC is initialized, information on the number of days of use may reflect the accumulated elapsed time (a+b+c).

Referring back to FIG. 5, the aerosol generating device 50 may further include a user interface (not shown) that outputs the time information output by the RTC 520 to the outside as the user input is received. The user interface may be a display, such as a liquid crystal display (LCD), an organic light emitting diode (OLED), a light emitting diode (LED), or the like. For example, the aerosol generating device 50 may display time information output by the RTC 520 as the user input is received by a user input unit, such as a button or a touch screen.

Also, the user interface may include terminals for data communication or supplying charging power, and various interfacing units, such as a communication interfacing module for performing wireless communication (e.g., Wi-Fi, Wi-Fi direct, Bluetooth, near-field communication (NFC) etc.) with an external device. The aerosol generating device 50 may be connected to a separate external device through the user interface and may transmit the time information output by the RTC 520 to an external device. In this case, the time information output by the RTC 520 may be accessed through a separate program provided in the external device. However, embodiments are not limited thereto.

Figure 8:
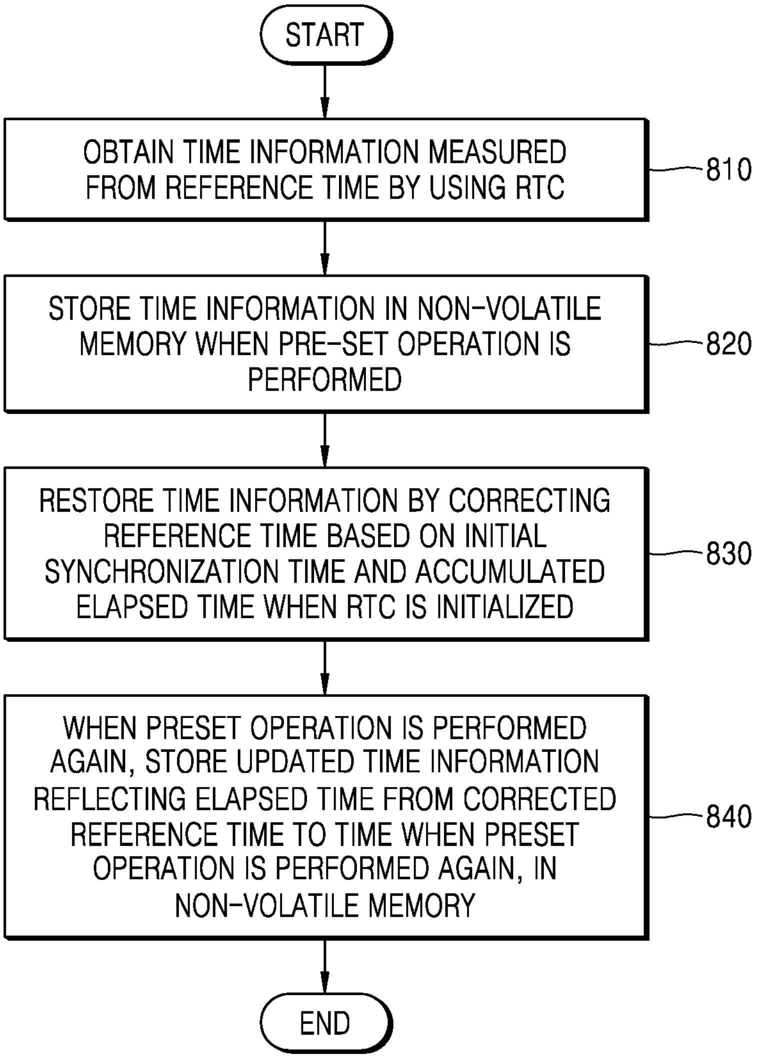
FIG. 8 is a flowchart illustrating an operating method of an aerosol generating device according to an embodiment.

FIG. 8 is a flowchart illustrating an operating method of an aerosol generating device according to an embodiment.

Referring to FIG. 8, the operating method of an aerosol generating device may include operations performed by the aerosol generating device 50. Thus, even if not described below, the above description of the aerosol generating device 50 of FIG. 5 may also be applied to the operating method of FIG. 8.

In operation 810, the aerosol generating device may obtain time information (i.e., elapsed time) measured based on the reference time by using the RTC. The RTC may start measurement of the time information when the aerosol generating device is released from the shipping mode.

In operation 820, the aerosol generating device may store the time information in the non-volatile memory when the preset operation is performed. The preset operation may include at least one of resetting or booting of the processor, release from the shipping mode, termination of a smoking operation, starting of a charging operation, and receiving of a user input. The aerosol generating device may store the time information in the non-volatile memory when it is determined that the preset operation has been performed.

The aerosol generating device may calculate an accumulated elapsed time based on the time information previously stored in the non-volatile memory and the initial synchronization time, and may obtain information on the number of days of use of the aerosol generating device based on the accumulated elapsed time. The initial synchronization time may be set by the supplier in the manufacturing process of the aerosol generating device and may be stored in the aerosol generating device. For example, the initial synchronization time may be stored in the processor or the memory of the aerosol generating device.

In operation 830, when the RTC is initialized, the aerosol generating device may restore the time information by correcting the reference time based on the initial synchronization time and the accumulated elapsed time. The RTC may be initialized when the processor is reset or booted, when an abnormal operation of the aerosol generating device is detected, or when power supply to the RTC is stopped (e.g., when the battery is exhausted). The aerosol generating device may correct the reference time by adding the accumulated elapsed time to the initial synchronization time.

In operation 840, when the preset operation is performed again, the aerosol generating device may store updated time information reflecting an elapsed time from the corrected reference time to a time when the preset operation is performed again, in the non-volatile memory. The aerosol generating device may overwrite the updated time information in the non-volatile memory.

In the aerosol generating device according to an embodiment, time information currently output by the RTC may be overwritten in the non-volatile memory without an additional process of reading the accumulated elapsed time and the current elapsed time from the non-volatile memory, calculating the sum of the accumulated elapsed time and the current elapsed time, and then storing the sum in the non-volatile memory. Also, the aerosol-generating device may calculate the number of days of use of the aerosol generating device through a relatively simple process of subtracting the initial synchronization time, which is previously known information, from the time information stored in the non-volatile memory.

In other words, even when the RTC is initialized, the reference time is corrected so that the time information currently output by the RTC includes the accumulated elapsed time from the initial reference time. Thus, information on the number of days of use of the aerosol generating device may be correctly maintained and managed.

On the other hand, the operating method of the aerosol generating device of FIG. 8 may be recorded in a computer-readable recording medium having one or more programs including instructions for executing the method recorded thereon. Examples of the computer-readable recording medium includes magnetic media, such as hard disks, floppy disks, and magnetic tapes, optical media, such as CD-ROMs and DVDs, magneto-optical media such as floptical disks, and hardware devices specially configured to store and execute program instructions, such as ROM, RAM, flash memory, and the like. Examples of program instructions include not only machine language codes such as those generated by a compiler, but also high-level language codes that may be executed by the computer using an interpreter or the like.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

What is claimed is:

1. An aerosol generating device comprising:
- a real-time clock (RTC) configured to output time information measured from a reference time;
- a non-volatile memory; and
- a processor configured to:
  - store the time information in the non-volatile memory when a preset operation is performed,
  - when the RTC is initialized, restore the time information by correcting the reference time based on an initial reference time and an accumulated elapsed time from the initial reference time, and
  - when the preset operation is performed again, store updated time information reflecting an elapsed time from the corrected reference time.

2. The aerosol generating device of claim 1, wherein the processor calculates the accumulated elapsed time based on time information previously stored in the non-volatile memory and the initial reference time, and obtains information on a number of days of use of the aerosol generating device based on the accumulated elapsed time.

3. The aerosol generating device of claim 1, wherein the initial reference time is set by a supplier in a manufacturing process of the aerosol generating device and is stored in the processor.

4. The aerosol generating device of claim 1, wherein the RTC is initialized when the processor is reset or booted, when an abnormal operation of the aerosol generating device is detected, or when power supply to the RTC is stopped.

5. The aerosol generating device of claim 1, wherein the processor corrects the reference time by adding the accumulated elapsed time to the initial reference time.

6. The aerosol generating device of claim 1, wherein
- the preset operation comprises at least one of resetting or booting of the processor, termination of a shipping mode, termination of a smoking operation, starting of a charging operation, and receiving of a user input.

7. The aerosol generating device of claim 1, wherein the processor overwrites the updated time information in the non-volatile memory.

8. The aerosol generating device of claim 1, wherein the RTC starts measurement of the time information when the aerosol generating device is released from a shipping mode.

9. The aerosol generating device of claim 1, further comprising a user interface configured to output the time information in response to a user input.

10. The aerosol generating device of claim 1, wherein the processor is implemented by a micro controller unit (MCU), and the RTC is embedded in the MCU.

11. An operating method of the aerosol generating device of claim 1, the operating method comprising:
- obtaining time information measured from a reference time by using a real-time clock (RTC);
- storing the time information in a non-volatile memory when a preset operation is performed;
- when the RTC is initialized, restoring the time information by correcting the reference time based on an initial reference time and an accumulated elapsed time from the initial reference time; and
- when the preset operation is performed again, storing updated time information reflecting an elapsed time from the corrected reference time in the non-volatile memory.

* * * * *